US009067488B2

(12) United States Patent
Ryu et al.

(10) Patent No.: US 9,067,488 B2
(45) Date of Patent: Jun. 30, 2015

(54) FILLER NECK APPARATUS FOR PREVENTING FUEL FROM MIXING

(71) Applicant: Hyundai Motor Company, Seoul (KR)

(72) Inventors: Bu Yeol Ryu, Hwaseong-si (KR); Pil Seon Choi, Anyang-si (KR); Bo Sung Lee, Daejeon (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/059,257

(22) Filed: Oct. 21, 2013

(65) Prior Publication Data

US 2014/0352846 A1 Dec. 4, 2014

(30) Foreign Application Priority Data

May 28, 2013 (KR) .................. 10-2013-0060064

(51) Int. Cl.
*B60K 15/04* (2006.01)
(52) U.S. Cl.
CPC .......... *B60K 15/04* (2013.01); *B60K 2015/0461* (2013.01); *B60K 2015/0483* (2013.01)
(58) Field of Classification Search
USPC ............. 141/311 R, 312, 348, 349, 350, 351, 141/352, 356, 363, 367, 369, 370, 372, 141/390; 220/4.14, 86.2, 86.4
See application file for complete search history.

(56) References Cited

U.S. PATENT DOCUMENTS

| 3,730,216 | A | * | 5/1973 | Arnett et al. | .................. | 137/588 |
| 4,977,936 | A | * | 12/1990 | Thompson et al. | ........... | 141/312 |
| 7,182,111 | B2 | * | 2/2007 | McClung et al. | ............. | 141/352 |
| 7,293,586 | B2 | * | 11/2007 | Groom et al. | .................. | 141/350 |
| 7,621,303 | B2 | * | 11/2009 | Buchgraber | .................. | 141/350 |
| 7,661,550 | B2 | * | 2/2010 | Feichtinger | .................. | 220/86.2 |
| 8,539,993 | B2 | * | 9/2013 | Hagano | .......................... | 141/350 |
| 8,776,845 | B2 | * | 7/2014 | Hagano | .......................... | 141/350 |
| 8,807,369 | B2 | * | 8/2014 | Sasaki | .......................... | 220/86.2 |
| 2006/0032552 | A1 | * | 2/2006 | Hedevang | ...................... | 141/367 |
| 2006/0289084 | A1 | | 12/2006 | Groom et al. | | |
| 2007/0034287 | A1 | * | 2/2007 | Groom et al. | ................. | 141/350 |
| 2007/0267099 | A1 | * | 11/2007 | Stephan et al. | ............... | 141/350 |
| 2008/0178962 | A1 | * | 7/2008 | Baudoux et al. | .............. | 141/350 |

(Continued)

FOREIGN PATENT DOCUMENTS

JP 2011-213233 A 10/2011
KR 10-0861482 B1 10/2008

(Continued)

*Primary Examiner* — Timothy L Maust
*Assistant Examiner* — Andrew Schmid
(74) *Attorney, Agent, or Firm* — Morgan, Lewis & Bockius LLP

(57) ABSTRACT

A filler neck apparatus may include a housing into which a fuel filling gun is selectively inserted, a rotation protrusion pivotally mounted on a side of the housing and elastically biased in a direction, wherein the rotation protrusion contacts with the fuel filling gun while the fuel filling gun is inserted into the housing, a slider slidably installed in the housing and elastically biased in a direction wherein the slider is selectively coupled to the rotation protrusion, and wherein a locked state of the slider is released by the rotation protrusion and is movable in a direction when the slider is released from the rotation protrusion, a flapper pivotally mounted on the housing and opening or closing the bottom end of the housing by the fuel filling gun, a stopper pivotally mounted on the housing and selectively locking the flapper, and a link pivotally connecting the slider and the stopper.

9 Claims, 5 Drawing Sheets

(56) References Cited

U.S. PATENT DOCUMENTS

| | | | |
|---|---|---|---|
| 2009/0020182 A1* | 1/2009 | Groom et al. | 141/349 |
| 2010/0012223 A1* | 1/2010 | Yoshida | 141/350 |
| 2010/0012224 A1* | 1/2010 | Yoshida | 141/350 |
| 2010/0175785 A1* | 7/2010 | Groom et al. | 141/350 |
| 2012/0211489 A1* | 8/2012 | Walser et al. | 220/86.2 |
| 2012/0279612 A1* | 11/2012 | Washio et al. | 141/350 |
| 2012/0312420 A1* | 12/2012 | Kataoka et al. | 141/350 |
| 2013/0233445 A1* | 9/2013 | Pfohl | 141/350 |
| 2014/0284329 A1* | 9/2014 | Frank et al. | 220/86.2 |
| 2014/0332529 A1* | 11/2014 | Ryu et al. | 220/86.2 |

FOREIGN PATENT DOCUMENTS

| | | |
|---|---|---|
| KR | 10-2009-0114949 A | 11/2009 |
| KR | 10-2012-0123422 A | 11/2012 |

* cited by examiner

FILLER NECK APPARATUS FOR PREVENTING FUEL FROM MIXING

CROSS-REFERENCE TO RELATED PATENT APPLICATION

This application claims the benefit of Korean Patent Application No. 10-2013-0060064, filed on May 28, 2013, the entire contents of which is incorporated herein for all purposes by this reference.

BACKGROUND OF THE INVENTION

1. Field of the Invention

The present invention relates to a filler neck device for preventing a gasoline fuel from mixing in a diesel car.

2. Description of Related Art

In general, a fuel tank for storing fuel required for combustion of an engine is provided in a car, and the fuel tank is connected to a fuel filling pipe, and a fuel filler neck for a car that represents a fuel supply hole is provided at an end of the fuel filling pipe so as to supply fuel.

A diameter of a fuel supply gun for injecting fuel into the fuel filler neck varies depending on a gasoline or diesel fuel, and the supply speed of fuel also varies.

Generally, the diameter of the fuel supply gun for injecting the diesel fuel is greater than the diameter of the fuel supply gun for injecting the gasoline fuel.

Thus, the diameter of the fuel supply hole for a diesel car is greater than the diameter of the fuel supply hole for a gasoline car.

Conventionally, the diesel fuel has been usually used for a large car, and recently, a car that uses the diesel fuel is widely spread, and self-fuel filling due to a high oil price is increasing.

However, due to a difference between a diameter of the fuel supply gun and a diameter of a fuel injection hole caused by a gasoline or diesel fuel, the fuel supply gun for the diesel car cannot be inserted into the fuel injection hole for the gasoline car. However, the fuel supply gun for the gasoline car can be inserted into the fuel injection hole for the diesel car so that the gasoline fuel may be supplied to the diesel car due to an oil-filling mistake.

In this case, if a diesel engine is driven in a state in which the gasoline fuel flows in a fuel system for the diesel car, the diesel car may stall during driving and may stop suddenly, mechanical abrasion caused by the gasoline fuel may occur, and when the diesel car stalls during driving, components relating to the gasoline fuel must be replaced with new one.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a filler neck device for preventing fuel from mixing, wherein rotation of a stopper is locked or unlocked according to the diameter of a fuel filling gun using a plurality of rotation protrusions disposed at sides of a housing in a circumferential direction of the housing so that gasoline can be prevented from mixing in a fuel tank for a diesel car.

According to an aspect of the present invention, a filler neck apparatus for preventing fuel from mixing, may include a housing into which a fuel filling gun is selectively inserted, a rotation protrusion that is pivotally mounted on a side of the housing and elastically biased in a direction, wherein the rotation protrusion contacts with the fuel filling gun while the fuel filling gun is inserted into the housing, a slider slidably installed in the housing and elastically biased in a direction wherein the slider is selectively coupled to the rotation protrusion, and wherein a locked state of the slider is released by action of the rotation protrusion and is movable in a direction when the slider is released from the rotation protrusion, a flapper that is pivotally mounted on a bottom end of the housing and opens or closes the bottom end of the housing by the fuel filling gun, a stopper that is pivotally mounted on the bottom end of the housing and selectively lock the flapper, and a link that pivotally connects the slider and the stopper.

The rotation protrusion may include an upper protrusion part pivotally mounted to the housing and a portion of the upper protrusion part is inserted into the housing through an opening formed in a side of the housing, a lower connection part that protrudes downwardly from a bottom surface of the upper protrusion part, and a hanging jaw that protrudes from a bottom end of the lower connection part and is selectively inserted in and fastened to a hanging hole of the slider so that the slider is selectively prevented from descending.

As a protrusion length of the rotation protrusion increases from a top end of the upper protrusion part to a downward direction in a radial direction of the housing, wherein when a diesel fuel filling gun is inserted into the housing, the rotation protrusion is rotatable due to a contact with the fuel filling gun, and as the hanging jaw is released from the hanging hole of the slider, the flapper is configured to be opened.

A plurality of upper protrusion parts is disposed at regular intervals along a circumferential direction of the housing from an upper portion of the housing, wherein a front side of each of the plurality of the upper protrusion parts is formed of a curved surface having a predetermined curvature along the circumferential direction of the housing, and wherein the fuel filling gun uniformly contacts the front side of the each of the plurality of the upper protrusion parts in the circumferential direction of the housing so that an insertion force of the fuel filling gun is able to be uniformly transferred to the upper protrusion parts.

The housing may include rotation protrusion insertion parts that are provided at both sides of the housing in a state in which openings formed in sides of the housing are disposed between rotation protrusion insertion parts and that may have a C-shaped cross-sectional insertion groove formed in the housing, wherein hinge protrusions formed at both sides of the rotation protrusion are inserted in and mounted in the rotation protrusion insertion parts and are rotatably combined with the rotation protrusion insertion parts.

The housing may include a leaf spring fixing part that is connected to both sides of the opening formed in sides of the housing in a transverse direction, wherein the rotation protrusion is elastically supported by a leaf spring, a top end of which is hung in and fixed to the leaf spring fixing part, and is restored to an original position of the rotation protrusion.

The filler neck apparatus may further include a retainer mounted on a top end of the housing, wherein the retainer may include an inlet part having a diameter increasing upwardly, an insertion part that protrudes from a bottom end of the inlet part in a circumferential direction of the housing in a direct downward direction and is inserted into the housing, a flange part that protrudes laterally from a top end of the insertion part, and fastening protrusions that protrude from a bottom surface of the flange part in a direct downward direction, are inserted into the rotation protrusion insertion parts and fix the hinge protrusions of the rotation protrusion.

The housing may include a housing guide that protrudes from an inner wall of the housing in a radial direction of the housing, wherein the slider slidably contacts with the housing guide, and wherein the housing regulates rotation of the slider in the circumferential direction of the housing.

The slider may include a fixing part for a slider spring that protrudes from an outer side of the slider in a L-shape, is opened in a downward direction and in which a top end of the slider spring is inserted and fixed, wherein the slider is elastically supported by the slider spring and is restored to an original position of the slider.

The link is hinge-coupled to hinge protrusions of the slider and hinge protrusions of the stopper through hinge grooves formed in top and bottom ends of the link and converts a rotation motion of the stopper into a straight line motion of the slider.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
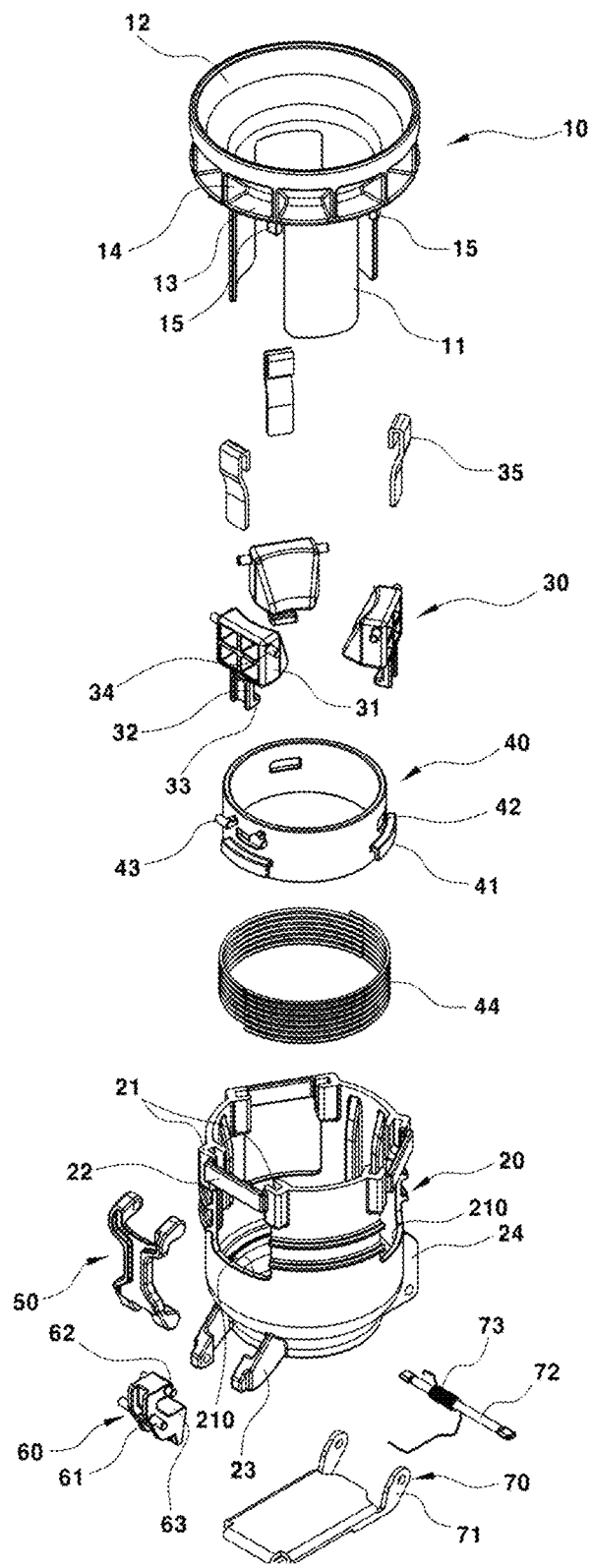
FIG. 1 is an exploded perspective view illustrating a filler neck device for preventing fuel from mixing, according to an exemplary embodiment of the present invention.
Figure 2:
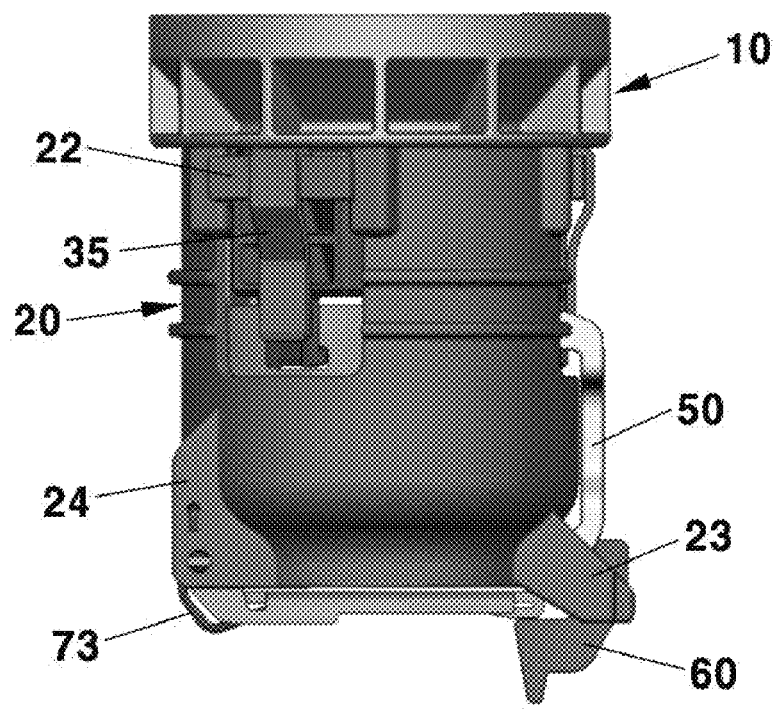
FIG. 2 is a side view illustrating the filler neck device for preventing fuel from mixing illustrated in FIG. 1.
Figure 3:
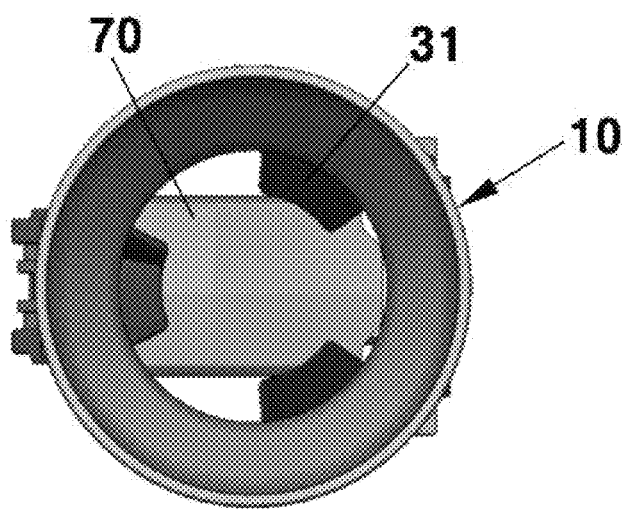
FIG. 3 is a plan view illustrating the filler neck device for preventing fuel from mixing of FIG. 1.
Figure 4:
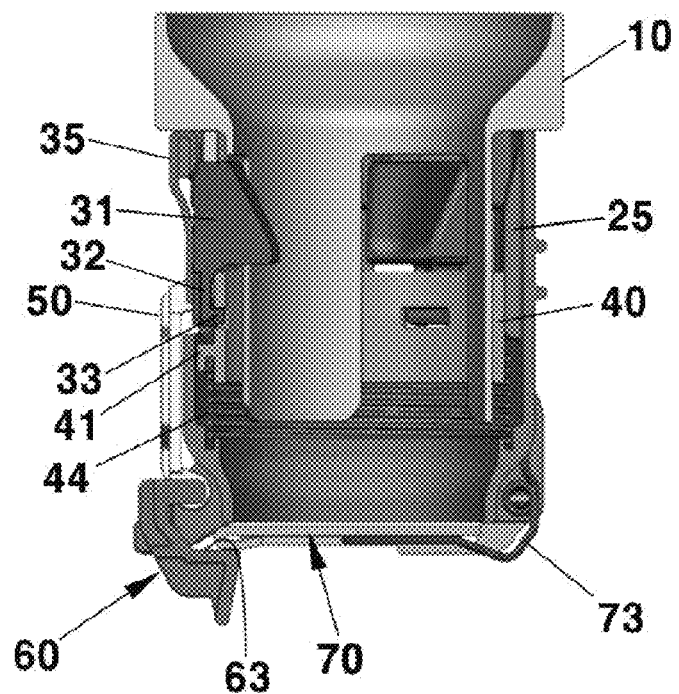
FIG. 4 is a cross-sectional view illustrating the configuration of the filler neck device for preventing fuel from mixing of FIG. 1.
Figure 5:
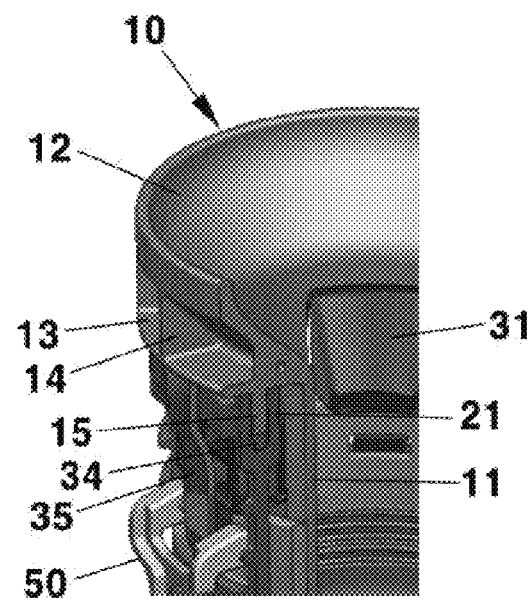
FIG. 5 is a cross-sectional perspective view illustrating the filler neck device for preventing fuel from mixing of FIG. 1.
Figure 6:
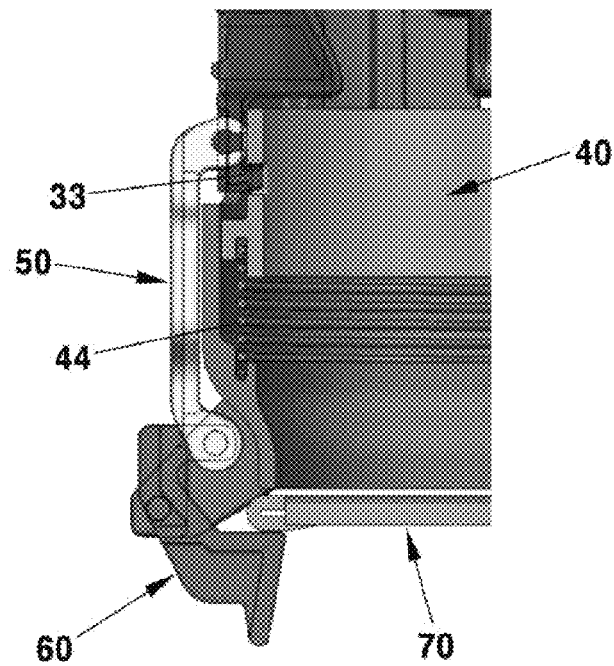
FIG. 6 is a cross-sectional view illustrating the main configuration of the filler neck device for preventing fuel from mixing of FIG. 1.
Figure 7:
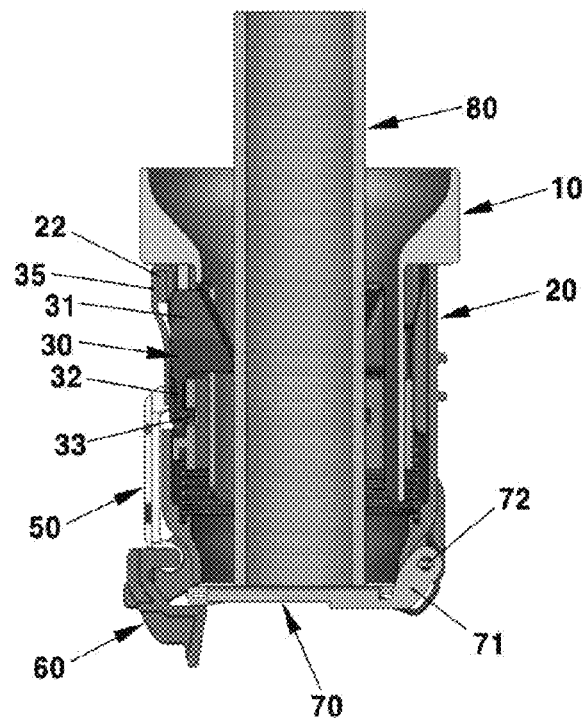
FIG. 7 is a cross-sectional view illustrating a state in which a gasoline fuel filling gun is inserted into the filler neck device for preventing fuel from mixing of FIG. 1.
Figure 8:
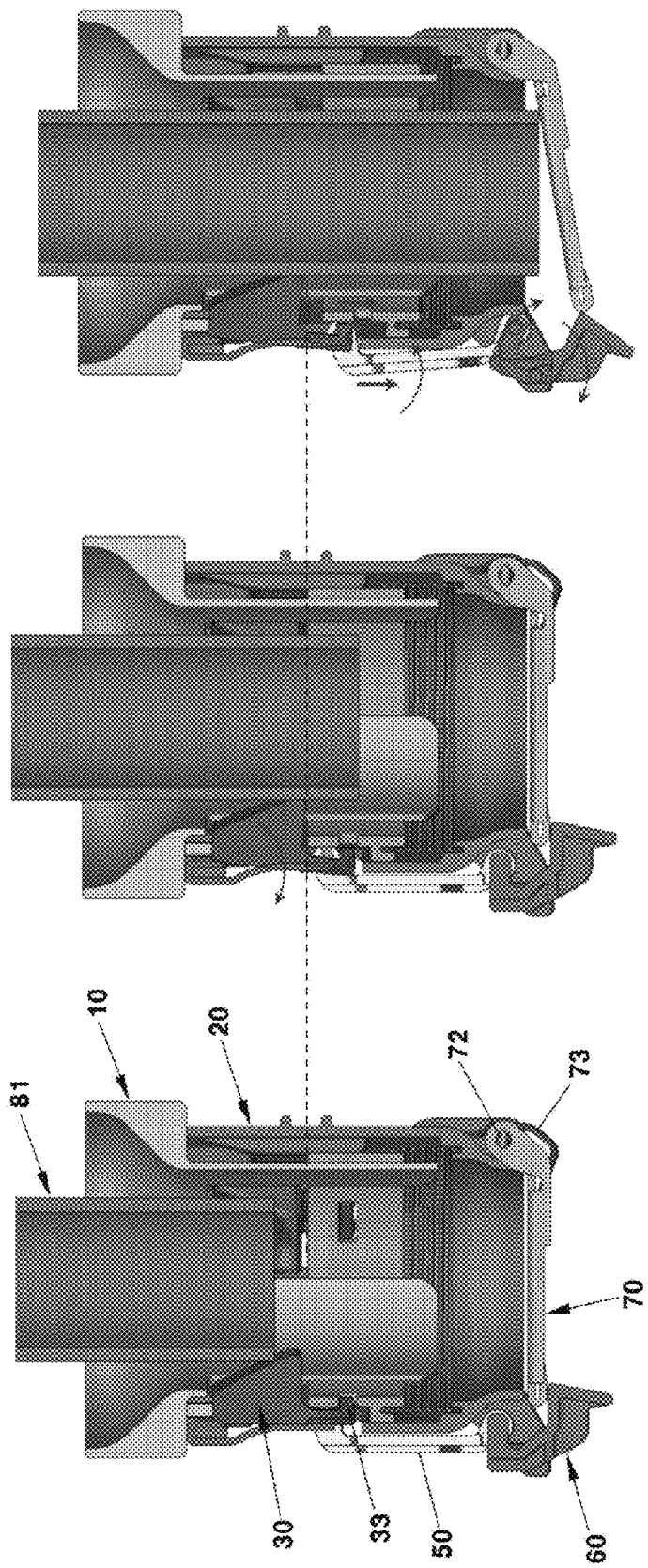
FIG. 8 is a cross-sectional view illustrating an operating state of the filler neck device for preventing fuel from mixing of FIG. 1 when a diesel fuel filling gun is inserted into the filler neck device for preventing fuel from mixing of FIG. 1.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention will now be described more fully with reference to the accompanying drawings, in which exemplary embodiments of the invention are shown, so that one of ordinary skill in the art can easily embody the present invention.

The present invention relates to a filler neck device for preventing fuel from mixing, wherein, when a gasoline fuel filling gun 80 is inserted into the filler neck device for preventing fuel from mixing, a flapper 70 is prevented from being opened and a gasoline fuel can be prevented from mixing in a fuel tank for a diesel car.

The filler neck device for preventing fuel from mixing according to an exemplary embodiment of the present invention is applied to a fuel system for the diesel car, and a gasoline fuel filling gun and a diesel fuel filling gun are generally disposed in one gas station and supply fuel for a gasoline car and fuel for the diesel car. However, due to a mistake of a fuel filling person, the gasoline fuel filling gun 80 may be inserted into a fuel injection hole for the diesel car. The purpose of the present invention is to fundamentally prevent the gasoline fuel filling gun 80 from being inserted into the fuel injection hole.

In other words, the filler neck device for preventing fuel from mixing according to an exemplary embodiment of the present invention allows the gasoline fuel filling gun 80 having a relatively small diameter not to be inserted into the fuel injection hole and only a diesel fuel filling gun 81 having a relatively large diameter to be inserted into the fuel injection hole.

To this end, the filler neck device for preventing fuel from mixing according to an exemplary embodiment of the present invention is installed at the fuel injection hole in which a fuel filling gun is inserted, and includes a housing 20, a retainer 10, rotation protrusions 30, a slider 40, a slider spring 44, a link 50, a stopper 60, a flapper 70, and a flapper spring 73.

Here, the fuel filling gun is inserted in the fuel injection hole means that, as the flapper 70 disposed in the lowest position in a vertical direction is pushed and opened, the fuel filling gun is downwardly inserted in the fuel injection hole.

The housing 20 is a cylindrical tubular structure in which a central axis of the housing 20 is disposed in a vertical direction. At least an inner diameter of the housing 20 is greater than an outer diameter of a fuel filling gun for a commonly-used diesel car so that not only a fuel filling gun for a passenger diesel car but also a fuel filling gun for a commonly-used diesel car having a larger diameter than that of the fuel filling gun for the commonly-used diesel car can pass through the housing 20.

The housing 20 has openings 210, which are formed in sides of the housing 20 and in which the rotation protrusions 30 may be inserted, and the openings 210 are spaced apart from each other by a predetermined gap in the circumferential direction of the housing 20, and rotation protrusion receiving parts 21 having C-shaped cross-sectional grooves facing each other are provided at both sides of the housing 20 in a state in which the openings 210 are disposed between the rotation protrusion receiving parts 21.

Each of the rotation protrusion receiving parts 21 has a structure in which a top end of the rotation protrusion receiving part 21 is opened with a C-shaped receiving groove, a bottom end and sides of the rotation protrusion receiving part 21 are closed and receiving grooves facing each other are formed in the rotation protrusion receiving part 21. Thus, hinge protrusions 34 of the rotation protrusions 30 are inserted in top ends of the rotation protrusion receiving parts 21 and are mounted in and supported in the insertion groove formed in an inner bottom surface of the rotation protrusion receiving part 21.

Also, leaf spring fixing parts 22 are disposed at the openings formed in sides of the housing 20 and connects both rotation protrusion receiving parts 21 to each other, and a top end of a leaf spring 35 is inserted in and hung from an upward direction of the leaf spring fixing parts 22 to a lower direction thereof.

A stopper support protrusion part 23 diagonally protrudes from one side of a bottom end of the housing 20, and a hinge hole is formed in a bottom end of the stopper support protrusion part 23 so that a central protrusion 61 of the stopper 60 can be rotatably supported through the hinge hole.

Also, a flapper support protrusion part 24 protrudes from the other side of the bottom end of the housing 20, and a hinge hole is formed in a bottom end of the flapper support protrusion part 24 so that a rotation shaft of the flapper 70 can be rotatably supported through the hinge hole.

The retainer 10 includes an insertion part 11 that is inserted in and mounted in an inner side of a top end of the housing 20, and an inlet part 12 having a diameter increasing upwardly from a top end of the insertion part 11.

An outer diameter of the insertion part 11 of the retainer 10 corresponds to an inner diameter of the housing 20 and the insertion part 11 of the retainer 10 is inserted into the housing 20, and a flange part 13 is horizontally formed on a top end of the insertion part 11 of the retainer 10 in a direction of the outer diameter of the insertion part 11 of the retainer 10, and fastening protrusions protrude from the flange part 13 in a direct downward direction.

In this case, the fastening protrusions 15 are inserted into top ends of the rotation protrusion receiving parts 21 so that the retainer 10 can be fixed to the housing 20 and hinge shafts 34 of the rotation protrusions 30 can be rotatably fixed.

In addition, openings are formed in the insertion part 11 of the retainer 10 at regular intervals in the circumferential direction of the housing 20, like in the housing 20 so that the rotation protrusions 30 can protrude laterally from an inner side of the housing 20 through the openings.

The inlet part 12 of the retainer 10 has a structure in which a diameter of an exterior part of the inner part 12 is relatively greater than a diameter of the housing 20 and an inner side of the inlet part 12 from the exterior part to the top end of the insertion part 11 is formed rounded so that the fuel filling gun can be easily inserted into the housing 20.

Also, the flange part 13 protrudes horizontally from the top end of the insertion part 11 of the retainer 10 in the direction of the outer diameter of the insertion part 11 of the retainer 10, and a plurality of reinforcement ribs 14 are vertically formed between the insertion part 11 of the retainer 10 and the flange part 13 at regular intervals in the circumferential direction of the housing 20 so that the strength of the inlet part 12 of the retainer 10 can be reinforced.

The rotation protrusions 30 directly contact the fuel filling gun when the fuel filling gun is inserted into the filler neck device for preventing fuel from mixing illustrated in FIG. 1. The rotation protrusions 30 are rotatably mounted in a top end of sides of the housing 20 and each include upper protrusion parts 31 disposed in an upper portion of each rotation protrusion 30 and having an approximately trapezoidal cross-sectional shape based on a cross-section in a vertical direction, lower connection parts 32 that protrude directly downwardly from centers of bottom surfaces of the upper protrusion parts 31, and hanging jaws 33 that protrude from bottom ends of the lower connection parts 32.

The upper protrusion parts 31 of the rotation protrusion 30 have hinge protrusions 34 that protrude laterally from both sides of each upper protrusion part 31, and the hinge protrusions 34 are inserted in and mounted in the rotation protrusion receiving parts 21 and are rotatably supported thereon.

Also, the upper protrusion parts 31 of the rotation protrusion 30 are laterally inserted into the housing 20 through the openings 210 formed in the housing 20 and the insertion part 11 of the retainer 10, and a front side of each upper protrusion part 31 that is positioned at an inner side of an opened surface of the insertion part 11 of the retainer 10, protrudes from its top end to a downward direction longer in a radial direction of the housing 20, and when the fuel filling gun is inserted into the housing 20 in the downward direction, the upper protrusion parts 31 of the rotation protrusion 30 are pushed backward (an outer side of the housing 20) and are rotated.

Also, the front side of each upper protrusion part 31 is formed of a curved surface having a predetermined curvature along the circumferential direction of the housing 20, and the fuel filling gun uniformly contacts the front side of each upper protrusion part 31 in the circumferential direction of the housing 20 so that an insertion force of the fuel filling gun is uniformly transferred to the upper protrusion parts 31.

Each of the lower connection parts 32 of the rotation protrusion 30 is disposed between a slider 40 and a leaf spring 35 that will now be described, and the hanging jaws 33 of the rotation protrusion 30 are inserted into hanging holes 42 of the slider 40 so that the slider 40 can be prevented from moving in the downward direction.

A rear side of the rotation protrusion 30 is formed of a vertical flat plane and contacts the leaf spring 35 so as to easily receive an elastic force of the slider spring 44.

The leaf spring 35 has an overall plate shape and has elasticity. A top end of the leaf spring 35 is bent in a U-shape and thus is hung in the leaf spring fixing parts 22 so that the leaf spring fixing parts 22 having a plate shape can be inserted into the U-shaped hanging grooves formed in the top end of the leaf spring 35, and when the retainer 10 is assembled with the top end of the housing 20, the retainer 10 is fixed by a downward pressurized force by the flange part 13 positioned in a side of the retainer 10, and when a top end of the leaf spring 35 is pressurized in a lateral direction of the housing 20, the leaf spring 35 can be rotatably deformed centering on the leaf spring fixing part 22 due to elasticity.

The slider 40 is inserted into the housing 20 in a circular ring shape and is elastically supported by a slider spring 44 to be movable in the vertical direction.

In this case, the slider 40 is disposed between the insertion part 11 of the retainer 10 and an inner wall of the housing 20, and a housing guide 25 protrudes from the inner wall of the housing 20 in a radial direction of the housing 20 so that the slider 40 can be prevented from rotating in the cylindrical direction, and the hanging jaws 33 of the rotation protrusion 30 can be easily inserted into the hanging holes 42 of the slider 40 that is regulated in the circumferential direction of the housing 20.

L-shaped spring fixing protrusions 41 protrude from one side of the slider 40 at regular intervals in the circumferential direction of the housing 20, and a top end of the slider spring 44 is inserted in and fixed to inner sides of the spring fixing protrusions 41, and a bottom end of the slider spring 44 is fixed in a spring fixing groove formed in a bottom end of an inner side of the housing 20.

Also, the hanging holes 42 are formed in the slider 40 at regular intervals in the circumferential direction of the housing 20 so the hanging jaws 33 of the rotation protrusion 30 can be hung in the hanging holes 42 of the slider 40.

Hinge protrusions 43 may protrude from one side of the slider 40 and may be hinge-coupled to the link 50 that will now be described.

The link 50 is a component for connecting the slider 40 and the stopper 60 and has a shape of a bar that extends in the vertical direction, and hinge grooves are formed in top and bottom ends of the link 50, and the link 50 is hinge-coupled to the hinge protrusions 43 of the slider 40 and hinge protrusions 62 formed on a top end of the stopper 60 through the hinge grooves.

In this case, the link 50 converts a rotation motion that occurs in the stopper 60 into a straight line motion and transfers force to the slider 40.

The stopper 60 has an approximately C-shape, and the hinge protrusions 62 are formed on both sides of the stopper 60 and are hinge-coupled to the hinge grooves formed in the stopper support protrusion part 23 of the housing 20 and are rotatable in the vertical direction.

Also, hanging grooves 63 are formed in the stopper 60, and the flapper 70 is inserted in the hanging grooves 63 so that rotation of the flapper 70 can be prevented.

The flapper 70 has a long plate shape and a gateway for a fuel injection hole through which the fuel filling gun passes, is rotatably installed at the bottom end of the housing 20 and opens or closes the bottom end of the housing 20.

In this case, one end of the flapper 70 is hung in the hanging groove 63 of the stopper 60, and a hinge part 71 is formed on the other end of the flapper 70 and is hinge-coupled to the housing 20 through a hinge hole formed in the hinge part 71.

That is, the hinge shaft 72 passes through the hinge hole formed in the hinge part 71 of the flapper 70 and the hinge hole formed in the flapper support protrusion part 24 of the housing 20 and are combined therewith, and thus the other end of the flapper 70 is hinge-coupled to the housing 20.

Also, a flapper spring 73 is inserted in and installed at the hinge shaft 72, and one end of the flapper spring 73 is fixed to the housing 20, and the other end of the flapper spring 73 is fixed to the flapper 70 so that the flapper 70 is returned to its original position (in a direction in which the flapper 70 is closed) by an elastic restoring force of the flapper spring 73.

An operating state of the filler neck device for preventing fuel from mixing having the above structure according to an exemplary embodiment of the present invention will now be described.

When the gasoline fuel filling gun 80 is inserted into the filler neck device for preventing fuel from mixing, the gasoline fuel filling gun 80 having a relatively small diameter rather than a minimum inner diameter of the rotation protrusion 30 does not push the rotation protrusions 30 and descends toward the flapper 70 while the gasoline fuel filling gun 80 is inserted into the housing 20.

In this case, although the gasoline fuel filling gun 80 pushes the flapper 70 in the downward direction, the flapper 70 is locked in the hanging grooves 63 of the stopper 60 and is not opened.

In general, the slider 40 is unlocked from the rotation protrusion 30 to descend and the stopper 60 may be rotated so that the flapper 70 can be opened.

However, when the gasoline fuel filling gun 80 is inserted into the filler neck device for preventing fuel from mixing, as described above, rotation of the rotation protrusions 30 is not affected. Thus, since the hanging jaws 33 of the rotation protrusions 30 are inserted in the slider 40, the slider 40 does not descend, and the stopper 60 connected to the slider 40 via the link 50 cannot be also rotated.

As a result, unless the rotation protrusions 30 can be pushed, furthermore, unless the hanging jaws 33 of the rotation protrusions 30 are simultaneously separated from the hanging holes 42 of the slider 40, the slider 40 cannot move in the downward direction, and the stopper 60 is locked by the link 50 and the slider 40. Thus, the flapper 70 is maintained in a state in which it is fastened to the stopper 60 and is not opened. Thus, the gasoline fuel filling gun 80 can be prevented from being clogged by the flapper 70 and a gasoline fuel from being injected into a fuel tank for a diesel car.

When the diesel fuel filling gun 81 having a relatively large diameter rather than a minimum inner diameter of the rotation protrusions 30 is inserted into the filler neck device for preventing fuel from mixing, the diesel fuel filling gun 81 and is inserted into the housing 20, the diesel fuel filling gun 81 pushes the rotation protrusions 30 and causes the rotation protrusions 30 to be rotated in an outer direction of the housing 20.

Subsequently, the hanging jaws 33 of the rotation protrusions 30 escape from the hanging holes 42 of the slider 40, and a locked state of the slider 40 is released.

When the diesel fuel filling gun 81 is inserted in the direct downward direction, the pushed state of the rotation protrusions 30 is maintained, and the fuel filling gun contacts the flapper 70 and pushes the flapper 70 in the downward direction. In this case, as the locked state of the slider 40 is released, the locked state of the stopper 60 connected to the slider 40 via the link 50 is also released, and thus the flapper 70 can be opened.

That is, if one end of the flapper 70 is inserted into the hanging grooves 63 of the stopper 60 and the diesel fuel filling gun 81 presses the stopper 60 in the downward direction, the top end of the stopper 60 is rotated, and the bottom end of the link 50 that is hinge-coupled to the top end of the stopper 60 is rotated in the downward direction, and the slider 40 that is hinge-coupled to the top end of the link 50 is pulled in the downward direction and descends so that the flapper 70 can be opened.

If the diesel fuel filling gun 81 is removed from an inner side of the housing 20, the flapper 70 is rotated at an original position, i.e., in a direction in which the flapper 70 is closed, by an elastic restoring force of the flapper spring 73, and the bottom end of the housing 20 is opened. When the fuel filling gun ascends toward the bottom end of each upper protrusion part 31 of the rotation protrusion 30, the slider 40 ascends at the original position by an elastic restoring force of the slider spring 44, and each upper protrusion part 31 of the rotation protrusion 30 is rotated toward the inner side of the housing 20 by an elastic restoring force of the leaf spring 35, and the hanging jaws 33 of the rotation protrusion 30 are returned to the hanging holes 42 of the slider 40 and are hung therein.

Thus, in this operating state, when the gasoline fuel filling gun 80 is inserted into the filler neck device for preventing fuel from mixing, movement of the rotation protrusions 30 is not changed, the slider 40 is hung in the hanging jaws 33 of the rotation protrusion and is locked, the stopper 60 connected to the slider 40 via the link 50 is also locked, and the flapper 70 is hung in the stopper 60 and is not opened so that the gasoline fuel filling gun 80 cannot be inserted into the filler neck device for preventing fuel from mixing, gasoline can be prevented from being injected into a fuel tank for a diesel car.

Also, when the diesel fuel filling gun 81 is inserted into the filler neck device for preventing fuel from mixing, as the rotation protrusions 30 are pushed and rotated, the locked state of slider 40 due to the hanging jaws 33 of the rotation protrusion 30 is released, and the stopper 60 connected to the slider 40 is also unlocked, the diesel fuel filling gun 81 is inserted into the filler neck device for preventing fuel from mixing, and the flapper 70 is opened so that only a diesel fuel can be supplied to the filler neck device for preventing fuel from mixing.

Advantages of a filler neck device for preventing fuel from mixing according to an exemplary embodiment of the present invention will now be described as follows.

When a diesel fuel filling gun is inserted into a filler neck device for preventing fuel from mixing according to an exemplary embodiment of the present invention, rotation protrusions are pushed and are rotated so that the locked state of a slider due to hanging jaws of the rotation protrusions is released, a stopper connected to the slider is also unlocked, the diesel fuel filling gun is inserted into the filler neck device for preventing fuel from mixing, and a flapper is opened so that the diesel fuel can be supplied to the filler neck device for preventing fuel from mixing.

However, when a gasoline fuel filling gun is inserted into the filler neck device for preventing fuel from mixing according to an exemplary embodiment of the present invention, movement of the rotation protrusions is not changed, the slider is hung and unlocked due to the hanging jaws of the rotation protrusions, the stopper connected to the slider via a link is also unlocked, the flapper is hung in the stopper and is not opened so that the gasoline fuel filling gun cannot be inserted into the filler neck device for preventing fuel from mixing according to an exemplary embodiment of the present invention and gasoline can be prevented from being injected into a fuel tank for a diesel car.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. filler neck apparatus for preventing fuel from mixing, comprising:
   a housing into which a fuel filling gun is selectively inserted;
   a rotation protrusion that is pivotally mounted on a side of the housing and elastically biased in a direction, wherein the rotation protrusion contacts with the fuel filling gun while the fuel filling gun is inserted into the housing;
   a slider slidably installed in the housing and elastically biased in a direction wherein the slider is selectively coupled to the rotation protrusion, and wherein a locked state of the slider is released by action of the rotation protrusion and is movable in a direction when the slider is released from the rotation protrusion;
   a flapper that is pivotally mounted on a bottom end of the housing and opens or closes the bottom end of the housing by the fuel filling gun;
   a stopper that is pivotally mounted on the bottom end of the housing and selectively lock the flapper; and
   a link that pivotally connects the slider and the stopper,
   wherein the rotation protrusion includes:
      an upper protrusion part pivotally mounted to the housing and a portion of the upper protrusion part is inserted into the housing through an opening formed in a side of the housing;
      a lower connection part that protrudes downwardly from a bottom surface of the upper protrusion part; and
      a hanging jaw that protrudes from a bottom end of the lower connection part and is selectively inserted in and fastened to a hanging hole of the slider so that the slider is selectively prevented from descending.

2. The filler neck apparatus of claim 1,
   wherein as a protrusion length of the rotation protrusion increases from a top end of the upper protrusion part to a downward direction in a radial direction of the housing, and
   wherein when a diesel fuel filling gun is inserted into the housing, the rotation protrusion is rotatable due to a contact with the fuel filling gun, and as the hanging jaw is released from the hanging hole of the slider, the flapper is configured to be opened.

3. The filler neck apparatus of claim 2,
   wherein a plurality of upper protrusion parts is disposed at regular intervals along a circumferential direction of the housing from an upper portion of the housing,
   wherein a front side of each of the plurality of the upper protrusion parts is formed of a curved surface having a predetermined curvature along the circumferential direction of the housing, and
   wherein the fuel filling gun uniformly contacts the front side of the each of the plurality of the upper protrusion parts in the circumferential direction of the housing so that an insertion force of the fuel filling gun is able to be uniformly transferred to the upper protrusion parts.

4. The filler neck apparatus of claim 1,
   wherein the housing includes rotation protrusion receiving parts that are provided at both sides of the housing in a state in which openings formed in sides of the housing are disposed between rotation protrusion receiving parts and that have a C-shaped cross-sectional insertion groove formed in the housing, and
   wherein hinge protrusions formed at both sides of the rotation protrusion are inserted in and mounted in the rotation protrusion receiving parts and are rotatably combined with the rotation protrusion receiving parts.

5. The filler neck apparatus of claim 1,
   wherein the housing includes a leaf spring fixing part that is connected to both sides of openings formed in sides of the housing in a transverse direction, and
   wherein the rotation protrusion is elastically supported by a leaf spring, a top end of which is hung in and fixed to the leaf spring fixing part, and is restored to an original position of the rotation protrusion.

6. The filler neck apparatus of claim 4, further including a retainer mounted on a top end of the housing, wherein the retainer includes:
   an inlet part having a diameter increasing upwardly;
   an insertion part that protrudes from a bottom end of the inlet part in a circumferential direction of the housing in a direct downward direction and is inserted into the housing;

a flange part that protrudes laterally from a top end of the insertion part; and fastening protrusions that protrude from a bottom surface of the flange part in a direct downward direction, are inserted into the rotation protrusion receiving parts and fix the hinge protrusions of the rotation protrusion.

7. The filler neck apparatus of claim 1, wherein the housing includes:

a housing guide that protrudes from an inner wall of the housing in a radial direction of the housing, wherein the slider slidably contacts with the housing guide; and wherein the housing regulates rotation of the slider in the circumferential direction of the housing.

8. The filler neck apparatus of claim 1, wherein the slider includes a fixing part for a slider spring that protrudes from an outer side of the slider in a L-shape, is opened in a downward direction and in which a top end of the slider spring is inserted and fixed, and wherein the slider is elastically supported by the slider spring to restore the slider to an original position thereof.

9. The filler neck apparatus of claim 1, wherein the link is hinge-coupled to hinge protrusions of the slider and hinge protrusions of the stopper through hinge grooves formed in top and bottom ends of the link and converts a rotation motion of the stopper into a straight line motion of the slider.

\* \* \* \* \*